(12) United States Patent
Andree et al.

(10) Patent No.: US 9,394,001 B2
(45) Date of Patent: Jul. 19, 2016

(54) DIAGONAL STRUT DEVICE, METHOD FOR MANUFACTURING SAME AND MOTOR VEHICLE UNDERFLOOR REINFORCED BY MEANS OF THE DIAGONAL STRUT DEVICE

(75) Inventors: Denis Andree, Hamburg (DE); Konrad Eipper, Rottenburg (DE); Thomas Rudlaff, Stuttgart (DE); Asmir Salkic, Ulm (DE); Mirko Sretenovic, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/979,456

(22) PCT Filed: Dec. 7, 2011

(86) PCT No.: PCT/EP2011/006128
§ 371 (c)(1),
(2), (4) Date: Aug. 6, 2013

(87) PCT Pub. No.: WO2012/100797
PCT Pub. Date: Aug. 2, 2012

(65) Prior Publication Data
US 2013/0300158 A1    Nov. 14, 2013

(30) Foreign Application Priority Data
Jan. 26, 2011   (DE) .......................... 10 2011 009 442

(51) Int. Cl.
*B60J 7/00*   (2006.01)
*B62D 21/06*  (2006.01)
(Continued)

(52) U.S. Cl.
CPC .............. *B62D 21/06* (2013.01); *B62D 25/087* (2013.01); *B62D 25/20* (2013.01); *B62D 29/008* (2013.01); *B62D 29/043* (2013.01); *Y10T 29/49622* (2015.01)

(58) Field of Classification Search
CPC .......... B64G 1/222; B64G 9/00; A61B 17/62; A61F 5/0125; A61F 2/915; A61F 2002/91558; A61F 2002/91583; A61F 2/91; A61F 2002/91525; E04C 3/005
USPC .......... 296/204; 403/217, 170, 171, 172, 176; 52/546, 693, 643, 653.1, 655.1, 81.3
See application file for complete search history.

(56) References Cited

U.S. PATENT DOCUMENTS 1,186,013 A * 6/1916 Loring ........................... 180/291
1,483,650 A * 2/1924 Corbin, Jr. ................ 296/181.4
(Continued)

FOREIGN PATENT DOCUMENTS

| CH | 240088 A | 11/1945 |
|---|---|---|
| DE | 102004018977 A1 | 11/2005 |

(Continued)

*Primary Examiner* — Kiran B Patel
(74) *Attorney, Agent, or Firm* — Patent Central LLC; Stephan A. Pendorf

(57) ABSTRACT

A diagonal strut device (1) for reinforcing arrangement on an undercarriage of a motor vehicle. A plurality of struts (2) made from a fiber-reinforced plastic composite material extend away from a central joint element (3). Each strut (2) can be connected to the undercarriage via this from the end facing away from the central joint element (3). For this, a connecting joint element (4) is arranged on the end of each strut (2) facing away from the central joint element (3), wherein the central joint element (3) and the connecting joint elements (4) are formed from a light metal material. The central joint element (3) and the connecting joint elements (4) are then connected to the struts (2) by an at least positive connection. The central joint element (3) and the connecting joint elements (4) are each formed from several individual elements joined together.

9 Claims, 2 Drawing Sheets

Figure 1:
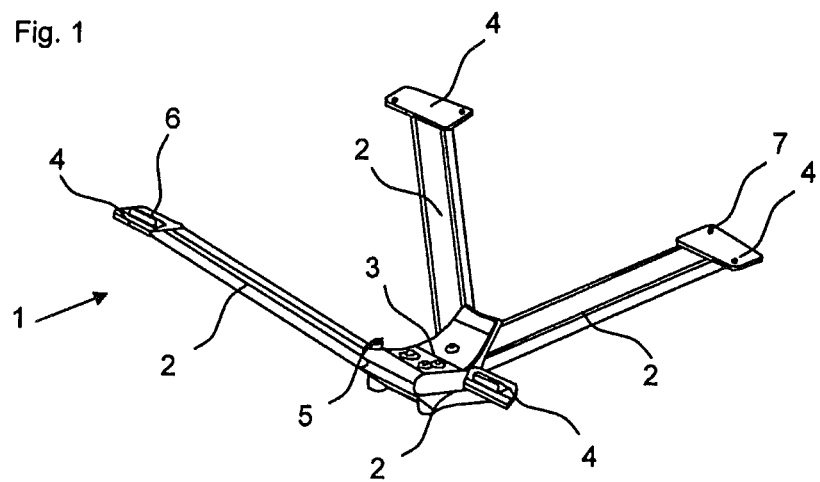

(51) Int. Cl.
*B62D 25/08* (2006.01)
*B62D 29/00* (2006.01)
*B62D 29/04* (2006.01)
*B62D 25/20* (2006.01)

(56) References Cited

U.S. PATENT DOCUMENTS

| | | | | |
|---|---|---|---|---|
| 1,577,060 | A | * | 3/1926 | Day ............................. 280/794 |
| 1,591,215 | A | * | 7/1926 | Jacobs ......................... 280/794 |
| 1,841,510 | A | * | 1/1932 | Van Ranst ................... 280/794 |
| 1,917,894 | A | * | 7/1933 | MacPherson ................ 180/292 |
| 2,080,748 | A | * | 5/1937 | Slack ........................... 280/793 |
| 2,121,007 | A | * | 6/1938 | Best ............................. 280/794 |
| 2,141,635 | A | * | 12/1938 | Almdale ...................... 280/794 |
| 2,163,694 | A | * | 6/1939 | Matthews et al. ........... 280/794 |
| 2,173,515 | A | * | 9/1939 | Eklund ......................... 280/794 |
| 2,173,516 | A | * | 9/1939 | Eklund ......................... 280/794 |
| 2,174,915 | A | * | 10/1939 | Dietrich ....................... 280/794 |
| 2,177,991 | A | * | 10/1939 | Maddock ..................... 280/794 |
| 2,229,371 | A | * | 1/1941 | Chayne ........................ 280/783 |
| 2,257,835 | A | * | 10/1941 | Best ............................. 280/794 |
| 2,314,603 | A | * | 3/1943 | Sorensen et al. ............. 280/794 |
| D149,830 | S | * | 6/1948 | Nelson ........................ D12/159 |
| 2,476,664 | A | * | 7/1949 | Humig ................... 280/124.111 |
| 2,676,030 | A | * | 4/1954 | Sherman ....................... 280/797 |
| 2,715,041 | A | * | 8/1955 | Fierbaugh et al. ........... 296/35.1 |
| 2,739,822 | A | * | 3/1956 | Schilberg .................... 280/794 |
| 2,747,887 | A | * | 5/1956 | Schilberg .................... 280/794 |
| 2,835,506 | A | * | 5/1958 | Schilberg .................... 280/794 |
| 4,048,806 | A | * | 9/1977 | Stuckmann et al. .......... 405/145 |
| 4,693,140 | A | * | 9/1987 | Stephan ................ B29C 53/585 74/579 R |
| 4,941,680 | A | * | 7/1990 | Baiker .......................... 280/793 |
| 5,507,522 | A | | 4/1996 | Ritchie |
| 6,126,199 | A | * | 10/2000 | Valin et al. .................... 280/781 |
| 6,468,613 | B1 | | 10/2002 | Kitano et al. |
| 6,854,791 | B1 | * | 2/2005 | Jaggi ................... B62D 29/041 296/203.01 |
| 6,869,136 | B2 | * | 3/2005 | Igarashi et al. ............... 296/204 |
| 7,055,837 | B2 | * | 6/2006 | Noble .................... 280/124.155 |
| 7,273,230 | B2 | * | 9/2007 | Kiel et al. ..................... 280/781 |
| 7,891,728 | B2 | * | 2/2011 | Westing et al. ............... 296/204 |
| 8,534,748 | B1 | * | 9/2013 | Aghssa et al. ............ 296/187.08 |
| 2004/0108754 | A1 | | 6/2004 | Igarashi et al. |
| 2005/0248113 | A1 | | 11/2005 | Kiel et al. |
| 2007/0107964 | A1 | | 5/2007 | Bunsmann et al. |
| 2007/0267895 | A1 | | 11/2007 | Stock-Hansen-Peiersen et al. |
| 2008/0231085 | A1 | | 9/2008 | Westing et al. |
| 2012/0306238 | A1 | * | 12/2012 | Midoun et al. ................ 296/204 |
| 2013/0187015 | A1 | * | 7/2013 | Quintana Rio ...... B32B 37/0053 248/200 |
| 2013/0249249 | A1 | * | 9/2013 | Andree ................... B62D 21/06 296/204 |

FOREIGN PATENT DOCUMENTS

| | | |
|---|---|---|
| DE | 69836259 T2 | 6/2007 |
| EP | 1415896 A2 | 5/2004 |
| FR | 2798354 A1 | 3/2001 |
| WO | 2005035334 A1 | 4/2005 |
| WO | 2005066011 A1 | 7/2005 |
| WO | 2005102824 A1 | 11/2005 |

* cited by examiner

DIAGONAL STRUT DEVICE, METHOD FOR MANUFACTURING SAME AND MOTOR VEHICLE UNDERFLOOR REINFORCED BY MEANS OF THE DIAGONAL STRUT DEVICE

The invention relates to a diagonal strut device for reinforcing arrangement on an undercarriage of a motor vehicle. The invention furthermore relates to a method for the production of the diagonal strut device and a motor vehicle undercarriage in which the diagonal strut device is used.

Diagonal struts for arrangement on the undercarriage of a motor vehicle are known to increase torsional rigidity. This is particularly important in convertibles with integral bodies, due to the lack of a fixed roof structure. Tensile and compressive forces are introduced from external edge regions of the body to a region located further inside a vertical motor vehicle median longitudinal plane via the diagonal struts, for example above the spare tyre recess. These tensile and compressive forces occur due to undesired vibrations and deformations of the body, which may arise during the driving operation, whereby driving safety and comfort are disadvantageously affected and the motor vehicle structure is loaded.

In this way, DE 10 2004 018 977 A1 describes a motor vehicle with increased possibilities for the strut course and its connection to the body. To that end, the vehicle has four reinforcing struts, which are fastened to a crossbeam, which is arranged freely beneath the undercarriage in the vertical median longitudinal plane of the vehicle and at a distance from this. The struts extend outwards from this crossbeam and are connected to the body in its undercarriage region at its ends that are facing away from the crossbeam. The struts can be formed from metal or a fibre-reinforced polymer.

In the course of the lightweight construction of motor vehicles, more and more hybrid components are being used, which connect different materials, for example light metal elements with fibre-reinforced polymers. DE 698 36 259 T2 discloses a light metal/CFK component, wherein a carbon fibre plastic material is affixed to a light metal material by means of an adhesive layer containing an epoxy adhesive and being provided in a thickness of 10 to 500 μm To prevent contact corrosion between the carbon fibre plastic material and the light metal material, the adhesive layer is to have a specific volume resistance of at least $1 \cdot 10^{13}$ Ω·cm and an adhesive strength at room temperature of at least 15 MPa.

Based on this prior art, the object arises to provide a diagonal strut device that increases the torsional rigidity of a motor vehicle for arrangement on a motor vehicle undercarriage, which allows for lightweight construction concepts and thus combines high tensile and compressive strength with low weight, and can be produced simply in very few steps.

This object is solved by a diagonal strut device having the features of claim 1. Developments of the device are embodied in the respective sub-claims.

The simple manufacturing of the diagonal strut device, which is suitable for mass production, in few steps, is solved by the method having the features of claim 11.

Furthermore, an improved motor vehicle undercarriage is disclosed by the use of the diagonal strut device on the undercarriage of a motor vehicle according to the features of claim 12.

A first embodiment of a diagonal strut device according to the invention, which is suitable for reinforcing arrangement on an undercarriage of a motor vehicle, deals with the fact that the diagonal strut device comprises several struts that consist of a fibre-reinforced plastic composite material and that extend away from a central joint element. The diagonal strut device can be connected to the undercarriage via the ends of the struts that face away from the central joint element. To that end, each strut end that faces away from the central joint element is provided with a connecting joint element according to the invention, which, just like the central joint element, is made from a light metal material. The central joint element and the respective connecting joint elements are each formed from several individual elements and are joined together. The joint elements are connected at least formfittingly to the struts.

The light metal joint elements according to the invention, together with the fibre-reinforced struts, advantageously lead to a clearly lower weight of the reinforcing construction than the diagonal struts made from steel material that are typically used.

Due to the framework-like construction of the diagonal strut device made from several struts, which are connected at one end by a joint and can be fixed to the body at the other end, only tensile and compressive forces arise in the individual fibre-reinforced struts, whereby the high torsional rigidity of the diagonal strut device comes about. The tensile and compressive forces, which are present at a motor vehicle undercarriage with the diagonal strut device according to the invention, are introduced into the body. The central and connecting joint elements are joined according to the invention from individual elements, which are connected formfittingly to the struts, while the individual elements are arranged around the struts and then joined together.

The joining of the individual elements of the central joint element and/or the connecting joint element can take place by means of welding, soldering, adhering or other connecting techniques, in particular while the individual elements are connected to one another by means of screws, rivets, nails or cotters.

In addition, the struts of the diagonal strut device can have apertures and/or structures at their end sections, which are positively permeated and/or enclosed by suitable structures of one or several individual elements of the central joint element and/or connecting joint element.

In a further embodiment of the diagonal strut device according to the invention, provision is made for the struts to have an activatable adhesive coating added to them at least at their end sections at which the formfitting connection is provided. The adhesive can be activated by means of IR, UV or other radiation, for example. This adhesive coating also enables, as well as the formfitting connection, an additional adhesive connection between the respective strut and the respective joint element and thus reinforces the diagonal strut device.

It is also conceivable to equip the struts with an adhesion-improving coating at least at their end sections, which for example has a structured surface and thus effects a mechanical clamping of a joint element to the respective end section of a strut.

A further embodiment of the diagonal strut device according to the invention deals with the fact that the diagonal strut device has connecting aids, by means of which they can be connected to the motor vehicle undercarriage more simply, which, if necessary, can have corresponding connecting agents. The connecting aids are provided on the connecting joint elements and here they can be bore holes, inserts, screw threads, adherends, clinch elements and/or weld contact areas.

Furthermore, the formfitting connection of the struts to the central joint element and the connecting joint element can additionally be reinforced by a firmly bonded connection that can be achieved by using rivets or screws, which ensures the connection of a respective element to the struts.

The struts of the diagonal strut device can be fibre-reinforced pultrusion profiles, which in particular can have a fibre proportion of up to 70% with respect to the total weight of the profiles, and thus can have a high level of tensile and compressive strength.

It is preferred for the diagonal strut device to be formed from up to four struts. In a particular embodiment, the diagonal strut device is formed from four struts that are arranged in an X-shape on the central joint element. For such a diagonal strut device, but also for diagonal strut devices that are designed differently with respect to the number or arrangement of the struts, the struts can be arranged to meet slanted at the central joint element, such that the central joint element is separated from the planes that fix the fastening elements located at the other ends of the struts. This separation also enables the connection of the diagonal strut device to an undercarriage with complicated body ratios.

The lightweight material for the formation of the joint elements is a light metal or a light metal alloy such as aluminium or magnesium or alloys thereof, for example with silicon.

A production method according to the invention for the diagonal strut device comprises the following steps:
  Providing a plurality of struts made from a fibre-reinforced plastic composite material,
  Providing a plurality of individual elements, which can be joined together to form a central joint element and connecting joint elements,
  Arranging the struts in such a way that, with a respective first end section, they come to lie close to one another in a region provided for the formation of the central joint element and, with their second end sections, at a distance from one another in a respective region provided for the formation of the connecting joint elements,
  Arranging several respective individual elements around the end sections of the struts,
  Joining these individual elements in such a way that they form a central joint element and connecting joint elements, which are at least formfittingly connected to the end sections of the struts.

Advantageously, the production method only requires inserting the fibre-reinforced struts into the individual elements of the joint elements and joining them, and can thus be embodied simply and efficiently. Further steps for the assembly of the central and connecting joint elements with the struts are dispensed with.

The diagonal strut device according to the invention is suitable for reinforcing arrangement on an undercarriage of a motor vehicle, wherein the central joint element of the diagonal strut device is arranged beneath the undercarriage in a vertical median longitudinal plane of the motor vehicle and the diagonal strut device is riveted, screwed, adhered, clinched and/or welded to the undercarriage during assembly or shell construction by means of the connecting joint element.

These and other advantages are demonstrated by the description of an exemplary embodiment below with reference to the accompanying figures. The reference to the figures in the description serves to support the description and to facilitate understanding of the subject matter. The figures are only a schematic depiction of an embodiment of the invention.

Figure 2:
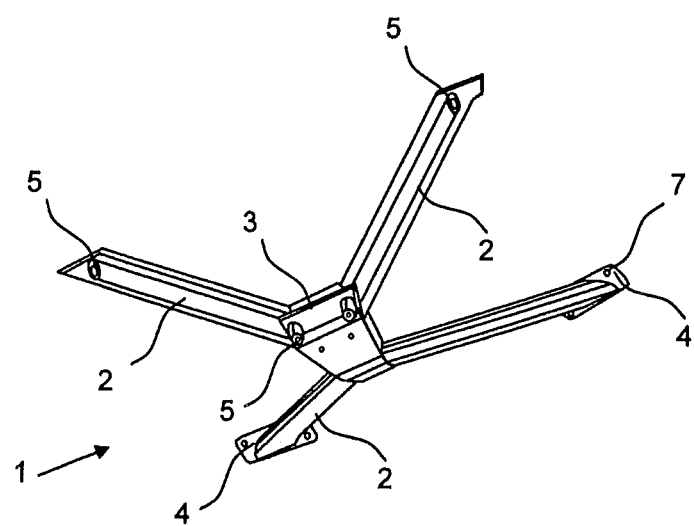

Here are shown:

FIG. 1 A perspective top view of an embodiment according to the invention of the diagonal strut device, FIG. 2 A perspective view from below onto an embodiment according to the invention of the diagonal strut device.

Figure 3:
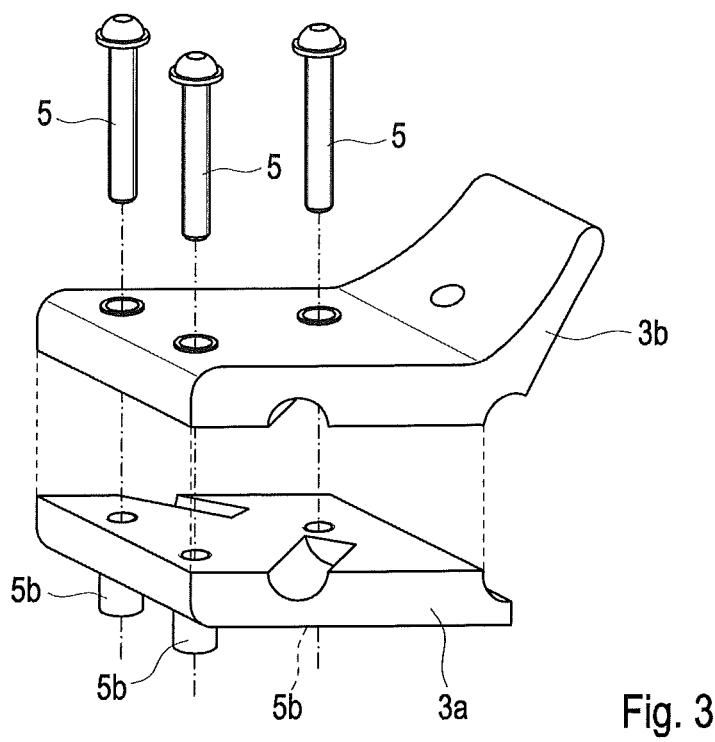

FIG. 3 An exploded top oblique view of the central joint element

Figure 4:
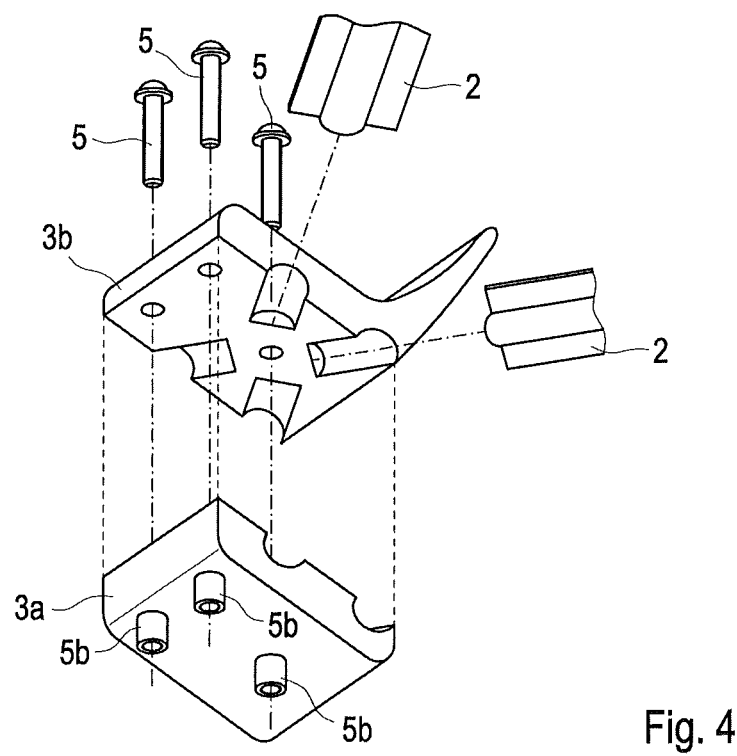

FIG. 4 An exploded bottom oblique view of the central joint element

The diagonal strut device according to the invention relates to a so-called framework construction depicted exemplarily in the figures.

The diagonal strut device 1 consists of four pultruded fibre-reinforced plastic struts 2, which are connected to one another by a central joined light metal joint 3. A different number of struts is of course possible—for example six struts. The joined connecting joint elements 4 provided for connection to a motor vehicle undercarriage also consist of a light metal material. The diagonal strut device 1 set up in this way can be fastened to the undercarriage during assembly or even during shell construction. This is made possible by the joined connecting joint elements 4, which can have corresponding connecting aids for this purpose.

By using a light metal material to create the joints 3, 4, the weight advantage of the fibre-reinforced plastic struts 2 can be maintained. Light metal materials are light metals and alloys having a thickness of less than 5 g/cm$^3$. Above all, there is a technical application for aluminium, magnesium, titanium and, on a small scale, beryllium and lithium. For both aluminium and magnesium alloys, components can be produced in die-casting as a near net shape without cost-intensive post-processing. Machined post-processing is possible, The diagonal strut device 1 shown in the figures can be arranged for reinforcing arrangement on an undercarriage of a motor vehicle, wherein the central joint element 3 of the diagonal strut device 1 is arranged beneath the undercarriage in a vertical median longitudinal plane of the motor vehicle and the diagonal strut device 1 is riveted, screwed, adhered, clinched and/or welded to the undercarriage during assembly or shell construction by means of the connecting joint element 4.

The diagonal strut device 1 in the figures has four struts 2 made from a fibre-reinforced plastic composite material, wherein these are fibre-reinforced plastic pultrusion profiles 2, which can have a fibre proportion of up to 70% and which extend away from the central joint element 3 in an X-shape in a slanted manner, such that the ends of the struts 2 that are facing away from the central joint element 3, at which the connecting joint elements 4 are present, fix a plane that is separated from the central joint element 3.

Due to the fact that the joint elements 3, 4 are joined around the end sections of the struts 2, a formfitting connection is provided. The joined individual elements of the central joint element 3 and/or the connecting joint element 4 are, for example, welded, soldered or adhered or connected to one another by additional connecting elements such as screws, rivets, nails or cotters.

The formfitting connection between a strut 2 and a joint element 3, 4 can be reinforced by apertures and/or structures, which can have the struts 2 at their end sections and which are positively permeated and/or enclosed by suitable structures of one or several individual elements of the central joint element 3 and/or connecting joint element 4.

Moreover, the struts have an activatable adhesive coating added to them at least at their end sections at which the formfitting connection is provided. The adhesive can be activated by means of IR, UV or other radiation, for example. This adhesive coating also enables, as well as the formfitting connection, an additional adhesive connection between the respective strut and the respective joint element and thus reinforces the diagonal strut device.

Diagonal strut device (1) according to at least one of claims 1 to 4,
characterised in that
the struts (2) have an adhesion-improving coating added to them at least at their end sections, at which the positive connection is provided, which in particular provides a structured surface.

A coating of the end sections of the struts 2 can also contribute towards adhesion improvement, in that the coating provides a structured surface that enables an additional mechanical clamping of the joint elements that are connected formfittingly to the struts 2.

The connecting joint elements 4 have, if necessary, connecting aids, by means of which the diagonal strut device 1 can easily be connected to an undercarriage, which in this case should have corresponding connection points to the connecting joint elements 4. Bore holes 7 or inserts, with or without screw threads in the connecting joint elements 4, are considered for being connecting aids, which allow connection with rivets or screws. It is also conceivable for the connecting joint elements 4 to provided surfaces that are provided for adhesion or welding. Another connection possibility for the connecting joint elements 4 is in the design of clinch elements 6, which have a shape similar to that of a push-button and which assume a formfitting and force-fit connection to a corresponding counter element (on the undercarriage).

The various connecting joint elements 4 of a diagonal strut device 1 can here have different connecting aids.

The central joint element 3 or the connecting joint element 4 or both can additionally be connected to the struts 2 by a force-fitting positive connection, by means of rivets or screws 5, for example.

To produce the diagonal strut device 1, the required fibre-reinforced plastic struts 2 are preferably produced by pultrusion. The required individual elements, which can be joined together to form a central joint element 3 and connecting joint element 4, are produced, in particular cast, from a light metal. The struts 2 are arranged in such a way that, with a respective first end section, they come to lie close to one another in a region provided for the formation of the central joint element 3 and, with their second end sections, at a distance from one another in a respective region provided for the formation of the connecting joint elements 4. Then, several respective individual elements are arranged around the end sections of the struts 2 and then joined together in such a way that they form a central joint element 3 and connecting joint elements 4, which are connected at least formfittingly to the end sections of the struts 2.

The diagonal strut device 1 is particularly suitable for a motor vehicle undercarriage. This is reinforced by the diagonal strut device 1, which is arranged on the motor vehicle undercarriage, wherein the diagonal strut device comprises a plurality of struts 2 made from a fibre-reinforced plastic composite material, which extends away from a central joint element 3, wherein each strut 2 is connected to the undercarriage via this from the end facing away from the central joint element 3, wherein a connecting joint element 4 is arranged on the end of each strut 2 facing away from the central joint element 3 and the connection with the undercarriage is provided unreleasably, and that the central joint element 3 and the connecting joint elements 4 are formed from a light metal material and are connected to the struts 2 by an at least formfitting connection, wherein the central joint element 3 and the connecting joint elements 4 are formed respectively from several joined individual elements.

The invention claimed is:

1. A diagonal strut device (1) for reinforcing arrangement on an undercarriage of a motor vehicle, wherein the diagonal strut device (1) comprises:
   a central joint element (3), and
   a plurality of struts (2) made from a fibre-reinforced plastic composite material, which extend away from the central joint element (3), wherein each strut (2) can be connected to the undercarriage via this end facing away from the central joint element (3),
   wherein a connecting joint element (4) is arranged on the end of each strut (2) facing away from the central joint element (3) to provide the connection to the undercarriage,
   wherein the central joint element (3) and the connecting joint elements (4) are formed from a light metal material,
   wherein the struts (2) have an adhesion-improving coating added to them at least at their end sections, at which the formfitting connection is provided, which provides a structured surface, and
   wherein the central joint element (3) and the connecting joint elements (4) are formed respectively from several joined individual elements, and are connected to the struts (2) by mechanical clamping of an at least formfitting connection.

2. The diagonal strut device (1) according to claim 1, wherein the joined individual elements of the central joint element (3) and/or the connecting joint elements (4) are welded, soldered or adhered or connected to one another by additional connecting elements such as screws, rivets, nails or cotter pins.

3. The diagonal strut device (1) according to claim 1, wherein the struts (2) have openings and/or structures at their end sections, which are permeated and/or enclosed formfittingly by suitable structures of one or several individual elements of the central joint element (3) and/or the connecting joint elements (4).

4. The diagonal strut device (1) according to claim 1, wherein the diagonal strut device (1) comprises connecting aids, by means of which the diagonal strut device (1) can be connected to the undercarriage, wherein the connecting aids are provided on the connecting joint element (4) and comprise bore-holes, inserts, screw threads, adherends, clinch elements and/or weld contact areas.

5. The diagonal strut device (1) according to claim 1, wherein the central joint element (3) and/or the connecting joint elements (4) are additionally connected to the struts (2) by a formfitting connection, in particular by riveting or screwing (5).

6. The diagonal strut device (1) according to claim 1, wherein the struts (2) are fibre-reinforced plastic pultrusion profiles (2), in particular having a fibre proportion of up to 70% with respect to the total weight of the fibre-reinforced plastic pultrusion profile.

7. The diagonal strut device (1) according to claim 1, wherein the diagonal strut device (1) comprises up to four struts (2), which are arranged slanted towards one another at the central joint element (3), such that the central joint element (3) is separated from a plane that fixes the fastening element (4).

8. The diagonal strut device (1) according to claim 1, wherein the diagonal strut device (1) comprises four struts (2), which are arranged in an X-shape on the central joint element (3), and/or which are arranged slanted towards one another at the central joint element (3), such that the central joint element (3) is separated from a plane that fixes the fastening element (4).

9. The diagonal strut device (1) according to claim 1, wherein the light metal material is a light metal or a light metal alloy, in particular an aluminium or magnesium alloy.

\* \* \* \* \*